(12) United States Patent
Maltsev et al.

(10) Patent No.: US 7,457,366 B2
(45) Date of Patent: Nov. 25, 2008

(54) SYSTEM AND METHOD FOR ADAPTIVE PHASE COMPENSATION OF OFDM SIGNALS

(75) Inventors: Alexander A. Maltsev, Nizhny Novgorod (RU); Alexey E. Rubtsov, Nizhny Novgorod (RU); Alexei M. Soupikov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 888 days.

(21) Appl. No.: 10/675,215

(22) Filed: Sep. 30, 2003

(65) Prior Publication Data

US 2004/0190637 A1    Sep. 30, 2004

Related U.S. Application Data

(63) Continuation of application No. PCT/RU03/00125, filed on Mar. 28, 2003.

(51) Int. Cl.
    *H04K 1/10* (2006.01)
(52) U.S. Cl. .................. 375/260; 375/340
(58) Field of Classification Search ............. 375/260, 375/340, 354; 370/210, 480
    See application file for complete search history.

(56) References Cited

U.S. PATENT DOCUMENTS

| | | | |
|---|---|---|---|
| 5,652,772 A | 7/1997 | Isaksson et al. | 375/367 |
| 5,732,113 A | 3/1998 | Schmidl et al. | 375/355 |
| 5,987,063 A | 11/1999 | Rinne | |
| 5,990,738 A * | 11/1999 | Wright et al. | 330/149 |
| 6,295,326 B1 | 9/2001 | Tonissen et al. | 375/350 |
| 6,320,915 B1 | 11/2001 | Stott et al. | 375/340 |
| 6,359,938 B1 | 3/2002 | Keevill et al. | 375/316 |

(Continued)

FOREIGN PATENT DOCUMENTS

EP      0645917 A2      3/1995

(Continued)

OTHER PUBLICATIONS

John G. Proakis, "Digital Communications", fourth edition, 2000, pp. 671-673.*

(Continued)

*Primary Examiner*—David C. Payne
*Assistant Examiner*—Leon Flores
(74) *Attorney, Agent, or Firm*—Schwegman, Lundberg & Woessner, P.A.; Gregory J. Gorrie (57) ABSTRACT

An OFDM receiver applies phase compensation to subcarriers of data symbols of an OFDM packet. A phase compensation estimate is generated from pilot subcarriers within the data symbol and applied to the subcarriers of the data symbol prior to demapping. The pilot subcarriers of the data symbol are combined and weighted to generate an observation vector. Recursive filtering is performed on the observation vector to generate the phase compensation estimate. The recursive filtering may include performing an extended Kalman-type filtering (EKF) operation on the observation vector using a channel estimate, an additive noise power estimate, a signal to noise ratio (SNR) estimate and a priori information about a dynamic model of the phase noise spectrum of transceiver oscillators. The channel estimate may be generated from a long training symbol of the OFDM packet, and the additive noise power estimate and the SNR estimate may be generated from short training symbols of the OFDM packet.

28 Claims, 3 Drawing Sheets

U.S. PATENT DOCUMENTS

| | | | |
|---|---|---|---|
| 6,363,128 B1 | 3/2002 | Isaksson et al. | 375/355 |
| 6,628,738 B1* | 9/2003 | Peeters et al. | 375/371 |
| 6,658,063 B1 | 12/2003 | Mizoguchi et al. | |
| 6,731,594 B1 | 5/2004 | Bohnke | |
| 7,039,000 B2 | 5/2006 | You et al. | |
| 7,251,282 B2 | 7/2007 | Maltsev et al. | |
| 7,336,597 B2 | 2/2008 | Maltsev et al. | |
| 2001/0015954 A1* | 8/2001 | Kuwabara et al. | 370/206 |
| 2002/0159533 A1 | 10/2002 | Crawford | 375/260 |
| 2002/0177427 A1* | 11/2002 | Nadgauda et al. | 455/403 |
| 2002/0181509 A1 | 12/2002 | Mody et al. | 370/480 |
| 2002/0186796 A1* | 12/2002 | McFarland et al. | 375/341 |
| 2003/0063558 A1* | 4/2003 | Kim | 370/208 |
| 2003/0123582 A1 | 7/2003 | Kim | |
| 2004/0001563 A1 | 1/2004 | Scarpa | 375/326 |
| 2004/0005018 A1 | 1/2004 | Zhu et al. | |

FOREIGN PATENT DOCUMENTS

| | | |
|---|---|---|
| EP | 0825737 A1 | 2/1998 |
| EP | 0933903 A2 | 8/1999 |
| EP | 1005204 A2 | 5/2000 |
| EP | 1071251 A2 | 1/2001 |
| EP | 1083683 A2 | 3/2001 |
| EP | 1168745 A1 | 1/2002 |
| EP | 1220505 A2 | 7/2002 |
| EP | 1313283 A2 | 5/2003 |

OTHER PUBLICATIONS

Christos Komninakis et al, "Multi-Input Multi-Output Fading Channel Tracking and Equalization Using Kalman Estimation", IEEE 2002.*

Keller, T., et al., "Orthogonal Frequency Division Multiplex Synchronization Techniques for Frequency-Selective Fading Channels", *IEEE Journal on Selected Areas in Communications*, vol. 19, No. 6, (Jun. 2001), 999-1008.

Chen, Bor-Sen, et al., "Frequency Offset Estimation in an OFDM System", *2001 IEEE Third Workshop on Signal Processing Advances, Wireless Communications 2001*, (2001), 150-153.

Dacca, M. R., et al., "Frequency Offset Tracking in OFDM Based on Multicarrier PLL", *21st Century Military Communications Conference Proceedings*, vol. 2, (2000), 912-916.

Larsson, Erik G., et al., "Joint symbol timing and channel estimation for OFDM based WLANs", *IEEE Communications Letters*, vol. 5, No. 8, (Aug. 2001), 325-327.

Li, Jian, et al., "Carrier Frequency Offset Estimation for IFDM-Based WLANs", *IEEE Signal Processing Letters*, vol. 8, No. 3, (Mar. 2001), 80-82.

Matheus, Kirsten, et al., "Parameter Optimization for Decision Directed Frequency Tracking for Coherent OFDM", *Global Telecommunications Conference, 2000, IDDD* vol. 3, (2000), 1402-1406.

Morelli, Michele, et al., "Carrier-Frequency Estimation for Transmission over Selective Channels", *IEEE Transactions on Communications*, vol. 48, No. 9, (Sep. 2000), 1580-1589.

Perets, R., et al., "A New Phase and Frequency Offset Estimation Algorithm for OFDM Systems Applying Kalman Filter", *22nd Convention of Electrical and Electronics Engineers in Israel*, IEEE, XP010631136, (Dec. 1, 2002), 300-302.

Schmidl, Timothy M., "Robust Frequency and Timing Synchronization for OFDM", *IEEE Transactions on Communications*, vol. 45, No. 12, (Dec. 1997), 1613-1621.

"U.S. Appl. No. 10/675,240 Notice of Allowance mailed Sep. 19, 2007", 15 pgs.

"U.S. Appl. No. 10/675,213 Non-Final Office Action mailed Jan. 17, 2007", 11 pgs.

"U.S. Appl. No. 10/675,213 Notice of Allowance mailed Mar. 23, 2007", 6 pgs.

"U.S. Appl. No. 10/675,213 Response filed Feb. 16, 2007 in response to Non-Final Office Action mailed Jan. 17, 2007", 15 pgs.

"U.S. Appl. No. 10/675,240 Response filed Jul. 20, 2007 in response to Non-Final Office Action mailed Jun. 11, 2007", 18 pgs.

"U.S. Appl. No. 10/675,240 Non-final office action mailed Jun. 11, 2007", 19 pgs.

* cited by examiner

SYSTEM AND METHOD FOR ADAPTIVE PHASE COMPENSATION OF OFDM SIGNALS

CROSS-REFERENCE TO RELATED APPLICATIONS

This application is a continuation under 37 C.F.R. 111(a) of International Application Ser. No. PCT/RU03/00125, filed Mar. 28, 2003, and published in English on Oct. 7, 2004 as WO 2004/086709, which is incorporated herein by reference. This application is related to the following, commonly assigned U.S. patent applications entitled "RECEIVER AND METHOD TO DETECT AND SYNCHRONIZE WITH A SYMBOL BOUNDARY OF AN OFDM SYMBOL", Ser. No. 10/675,213, filed on same date herewith, and "SYSTEM AND METHOD FOR TWO-CHANNEL FREQUENCY OFFSET ESTIMATION OF OFDM SIGNALS", Ser. No. 10/675,240, filed on same date herewith. These commonly assigned patent applications are incorporated herein by reference.

TECHNICAL FIELD

The present invention pertains to wireless communications, and in one embodiment, to receivers for orthogonal frequency division multiplexed (OFDM) communications.

BACKGROUND

Orthogonal frequency division multiplexing (OFDM) is a multi-carrier transmission technique that uses orthogonal subcarriers to transmit information within an available spectrum. Because the subcarriers may be orthogonal to one another, they may be spaced much more closely together within the available spectrum than, for example, the individual channels in a conventional frequency division multiplexing (FDM) system. To help achieve orthogonality, a subcarrier may have a null at the center frequency of the other subcarriers. Orthogonality of the subcarriers may help prevent inter-subcarrier interference within the system. Before transmission, the subcarriers may be modulated with a low-rate data stream. The transmitted symbol rate of OFDM symbols may be low, and thus the transmitted OFDM signal may be highly tolerant to multipath delay spread within the channel. For this reason, many modem digital communication systems are turning to OFDM as a modulation scheme for signals that need to survive in environments having multipath reflections and/or strong interference. Many wireless communication standards have already adopted OFDM including, for example, the IEEE 802.11a standard, the Digital Video Broadcasting Terrestrial (DVB-T) standard, and the High performance radio Local Area Network (HiperLAN) standard. In addition, several industry consortia, including the Broadband Wireless Internet Forum and the OFDM Forum, are proposing OFDM for fixed wireless access systems.

One problem with OFDM systems is that they may be more sensitive to phase noise and frequency variation relative to single carrier systems. Unlike single carrier systems, phase noise and frequency variation in OFDM systems introduce interference, including inter-carrier interference and inter-symbol interference. Some conventional OFDM systems use special training symbols and/or phase locked loops (PLLs) for estimating frequency offset and for tracking phase variations, however accurate frequency synchronization and phase compensation using these techniques is especially difficult because of the noise and channel effects, such as linear distortion in a multipath channel. Thus there is a general need fro systems and methods that provide frequency synchronization and phase tracking in an OFDM receiver system.

BRIEF DESCRIPTION OF THE DRAWINGS

The appended claims are directed to some of the various embodiments of the present invention. However, the detailed description presents a more complete understanding of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice it. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of the invention encompasses the full ambit of the claims and all available equivalents.

Figure 1:
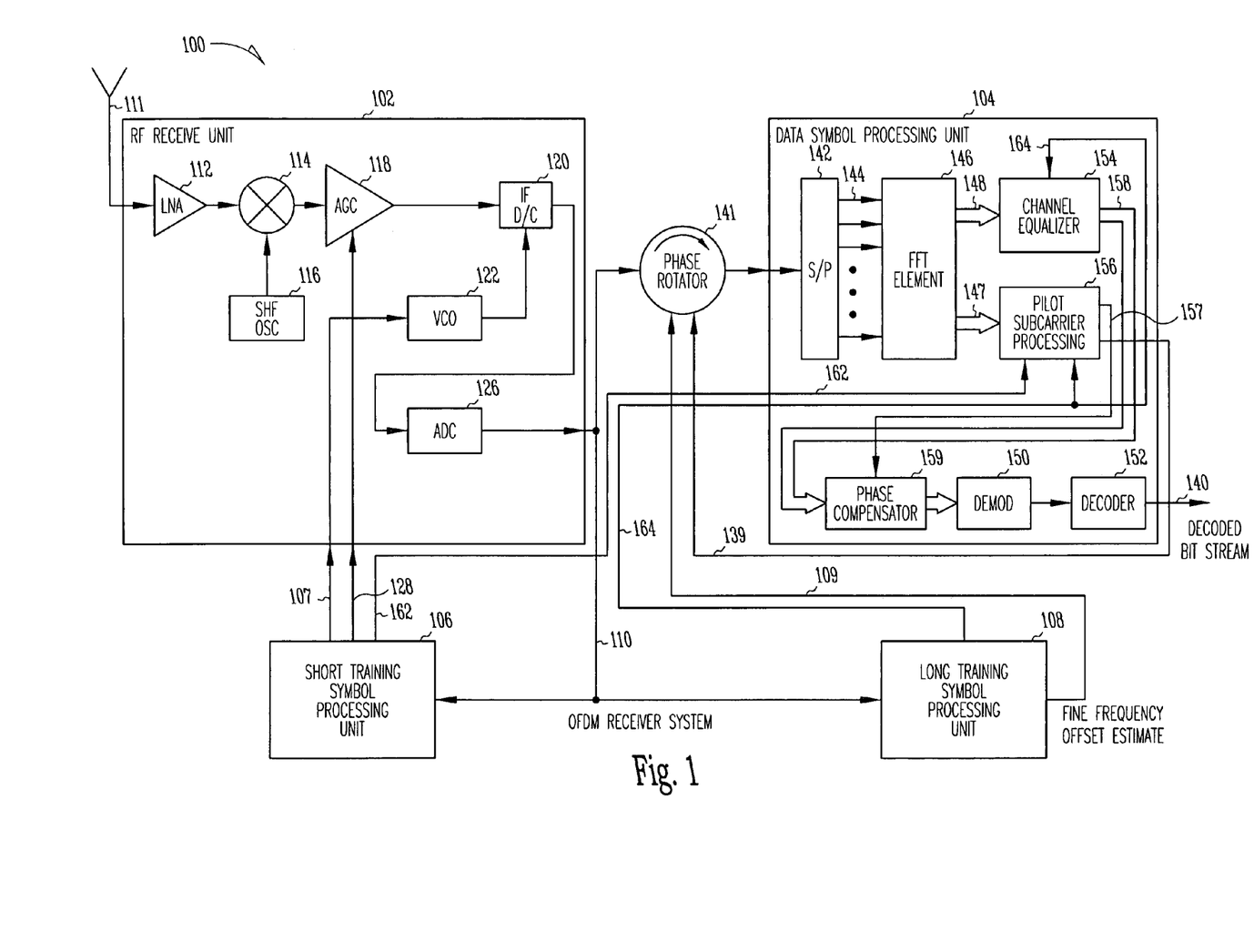
FIG. 1 is a simplified functional block diagram of an orthogonal frequency division multiplexed (OFDM) receiver system in accordance with an embodiment of the present invention.

FIG. 1 is a simplified functional block diagram of an orthogonal frequency division multiplexed (OFDM) receiver system in accordance with an embodiment of the present invention. OFDM receiver system 100 may include radio frequency (RF) receive unit 102, data symbol processing unit 104, short training symbol processing unit 106 and long training symbol processing unit 108. RF receive unit 102 receives signals through antenna 111 and generates serial symbol stream 110 of OFDM symbols. Data symbol processing unit 104 processes serial symbol stream 110 to generate decoded bit stream 140.

In accordance with an embodiment of the present invention, OFDM receiver system 100 may apply phase compensation to subcarriers of the data symbols of an OFDM packet after channel equalization and before symbol demapping. A phase compensation estimate may be generated from pilot subcarriers within the data symbol and applied to the subcarriers of the data symbol prior to demapping. The pilot subcarriers of the data symbol may be combined and weighted to generate an observation vector, and recursive filtering may be performed on the observation vector to generate the phase compensation estimate. The pilot subcarriers may be weighted based on fading gains to maximize a signal to noise ratio (SNR) of the observation vector. The recursive filtering may include performing extended Kalman filtering (EKF) on the observation vector using a channel estimate, an additive noise power estimate, a signal to noise ratio (SNR) estimate, a transceiver oscillator phase noise power and/or other a priori information determined from dynamic models of the phase. The channel estimate may be generated from a long training symbol of the OFDM packet, and the additive noise power estimate and the SNR estimate may be generated from short training symbols of the OFDM packet. The phase noise power may be evaluated form a priori information about the phase noise spectrum of transceiver oscillators. The channel estimate, the additive noise power estimate, the SNR estimate, and the phase noise power value may be used for subsequent data symbols of the OFDM packet.

An OFDM data packet may be comprised of a plurality of sequential symbol modulated subcarriers. The packet may start with short training symbols, which may use only a portion of the subcarriers. The short training symbols may be followed by a long training symbol and the data symbols. The data symbols may contain known pilot subcarriers. The data symbols may be time multiplexed with data symbols comprising known pilot subcarriers as well as data subcarriers.

In one embodiment, an OFDM packet may comprise approximately fifty-two subcarriers, and in other embodiments, the OFDM packet may comprise up to a hundred or more subcarriers. In one embodiment, an OFDM packet may start with approximately ten short training symbols, and in other embodiments, the OFDM packet may start with as little as one and as many as fifty or more short training symbols. In one embodiment, an OFDM packet may include approximately one long training symbol, and in other embodiments, the OFDM packet may include up to ten or more long training symbols. In one embodiment, the data symbols may contain approximately four known pilot subcarriers, and in other embodiments, the data symbols may contain as little as one and as many as ten or more pilot subcarriers.

OFDM receiver system 100 may be part of a wireless communication device or may be part of a stand-alone receiver. OFDM receiver system 100 may be part of wireless communication devices such as personal digital assistants (PDAs), laptop and portable commuters with wireless communication capability, web tablets, wireless telephones, wireless headsets, pagers, instant messaging devices, MP3 players, digital cameras, and other devices that may receive and/or transmit information wirelessly. OFDM receiver system 100 may receive communication signals transmitted in accordance with a multi-carrier transmission technique, such as an OFDM technique, which may use substantially orthogonal subcarriers to transmit information within an assigned spectrum. OFDM receiver system 100 may receive communications in accordance with one or more communication standards, such as one of the IEEE 802.11a, b or g standards, the Digital Video Broadcasting Terrestrial (DVB-T) standard, or the High performance radio Local Area Network (HiperLAN) standard. Signal communications in accordance with other local area network (LAN) and wireless local area network (WLAN) communication techniques may also be suitable for receipt by OFDM receiver system 100.

OFDM receiver system 100 may include RF receive unit 102, which receives signals through antenna 111 and generates serial symbol stream 110 of OFDM symbols. Data symbol processing unit 104 processes serial symbol stream 110 to generate decoded bit stream 140. Antenna 111 may be, for example, a dipole antenna, monopole antenna loop antenna, microstrip antenna or other type of antenna suitable for reception and/or transmission of multi-carrier communication signals including OFDM packets. In one embodiment, an OFDM packet may include a plurality of short training symbols and a plurality of long training symbols followed by data symbols.

In one embodiment, the received signal may have a carrier frequency ranging between five and six GHz, although embodiments of the present invention are equally suitable for receipt of carrier frequencies, for example, ranging between one and ten 10 GHz. An OFDM signal may, for example, reside on up to a hundred or more subcarriers. The short training symbols may be transmitted on a portion of the subcarriers, and data symbols may contain one or more known pilot subcarriers although this is not a requirement. In one embodiment, the long training symbols may have a duration of approximately between three and four microseconds and the short training symbols may have a duration of up to approximately one microsecond.

RF receive unit 102 may perform a two-stage down conversion. RF receive unit 102 may include low-noise amplifier (LNA) 112 and RF down-converter 114. RF down-converter 114 may generate an intermediate frequency (IF) signal using signals from oscillator 116. Oscillator 116 may be fixed frequency heterodyne oscillator. Automatic gain control (AGC) element 118 may adjust a power level for IF down-converter 120 in response to AGC signal 128 from unit 106. IF down-converter (D/C) 120 may generate in-phase (I) signals and quadrature phase (Q) signals at zero frequency using a frequency controllable device such as voltage-controlled oscillator (VCO) 122, which may be responsive to coarse frequency offset signal 107. Coarse frequency offset signal 107 may be a part of a feedback loop and provided by short training symbol processing unit 106. The in-phase (I) signals and quadrature phase (Q) signals, provided by IF down-converter 120, may be sampled and converted to serial digital bit stream 110 by analog to digital converter (ADC) 126. Serial digital bit stream 110 produced by ADC 126 may be a serial symbol stream of OFDM symbols in the case of receipt of an OFDM packet. OFDM system 100 may also include phase rotator 141 may rotate the phase of symbols of stream 110 in response to fine frequency offset estimate 109, which may be generated by long training symbol processing unit 108. In an alternate embodiment, phase rotator 141 may be responsive to frequency-offset estimate 139 provided by data signal processing unit 104.

In one embodiment, short and long training symbol processing units 106 and 108 may perform packet detection and synchronization with OFDM symbol boundaries and may initiate data processing by data symbol processing unit 104. Data symbol processing unit 104 processes serial symbol stream 110 of OFDM symbols to generate decoded bit stream 140. Long training symbol processing element 108 may generate channel estimate 164 from a long training symbol of the OFDM packet for use by data symbol processing unit 104. Short training symbol processing unit 106 may generate an additive noise power estimate and a signal to noise ratio (SNR) estimate 162 from one or more of the short training symbols of the OFDM packet for use by data symbol processing unit 104.

Data symbol processing unit 104 may include serial to parallel converter 142 to convert a symbol from serial symbol stream 110 into parallel groups of time domain samples 144. Data symbol processing unit 104 may also include FFT element 146, which may perform a Fast Fourier Transform (FFT) on parallel groups of time domain samples 144 to generate frequency domain symbol modulated subcarriers 148. In one embodiment, FFT element 146 may be responsive to a fine timing signal. Channel equalizer 154 may perform a channel equalization on frequency domain symbol modulated subcarriers 148 provided by FFT element 146. Channel equalizer 154 may generate channel equalized frequency domain symbol modulated subcarriers 158 using channel estimations 164 generated by long training symbol processing element 108. Channel estimations 164 generated by long training symbol processing element 108 may be made by performing an FFT on known training symbols, such as the long training symbols, before data symbol processing begins. Equalized frequency domain symbol modulated subcarriers 158 may be coherently demodulated by demodulator 150 to produce a plurality of parallel symbols. Demodulator 150 may demodulate the subcarriers in accordance with a particular modulation order in which a transmitter modulated the subcarriers.

Data symbol processing unit 104 may also include pilot subcarrier processing unit 156, which may act as a phase tracking unit to generate phase compensation estimate 157 for a data symbol of the OFDM packet. Pilot subcarrier processing unit 156 may use pilot subcarriers 147 within the data symbol separated within FFT element 146. Data symbol processing unit 104 may also include phase compensator 159 to apply phase compensation estimate 157 to the subcarriers of the data symbol prior to demapping. In one embodiment, pilot subcarrier processing unit 156 may also use channel estimate 164 generated by long training symbol processing element 108. Pilot subcarrier processing unit 156 may also use additive noise power estimate and a signal to noise ratio (SNR) estimate 162 generated by short training symbol processing unit 106 and/or a phase noise power value determined from a priori information about the phase noise spectrum of transceiver oscillators to generate the phase compensation estimate 157. Pilot subcarriers 147 may be separated from other subcarriers 148 of a data symbol during performance of an FFT by FFT element 146.

In accordance with one embodiment of the present invention, phase rotator 141 may rotate the phase of symbols of symbol stream 110 in response to a frequency offset estimate 109 provided by long training symbol processing element 108. In this embodiment, fine frequency offset estimate 109 may be determined from long training symbols of an OFDM packet. The phase-shift provided by phase rotator 141 may be held constant for processing the data symbols of the OFDM packet. In accordance with another embodiment, frequency offset estimate 139 may alternatively be provided to phase rotator 141 by a pilot subcarrier processing element of data symbol processing unit 104. This is described in more detail below.

Although OFDM receiver system 100 is illustrated as having several separate functional elements, one or more of the functional elements may be combined and may be implemented by combinations of software configured elements, such as processors including digital signal processors (DSPs), and/or other hardware elements. Although embodiments of the present invention are described with respect to OFDM communications, embodiments of the present invention may be suitable to any multi-carrier communication technique.

Figure 2:
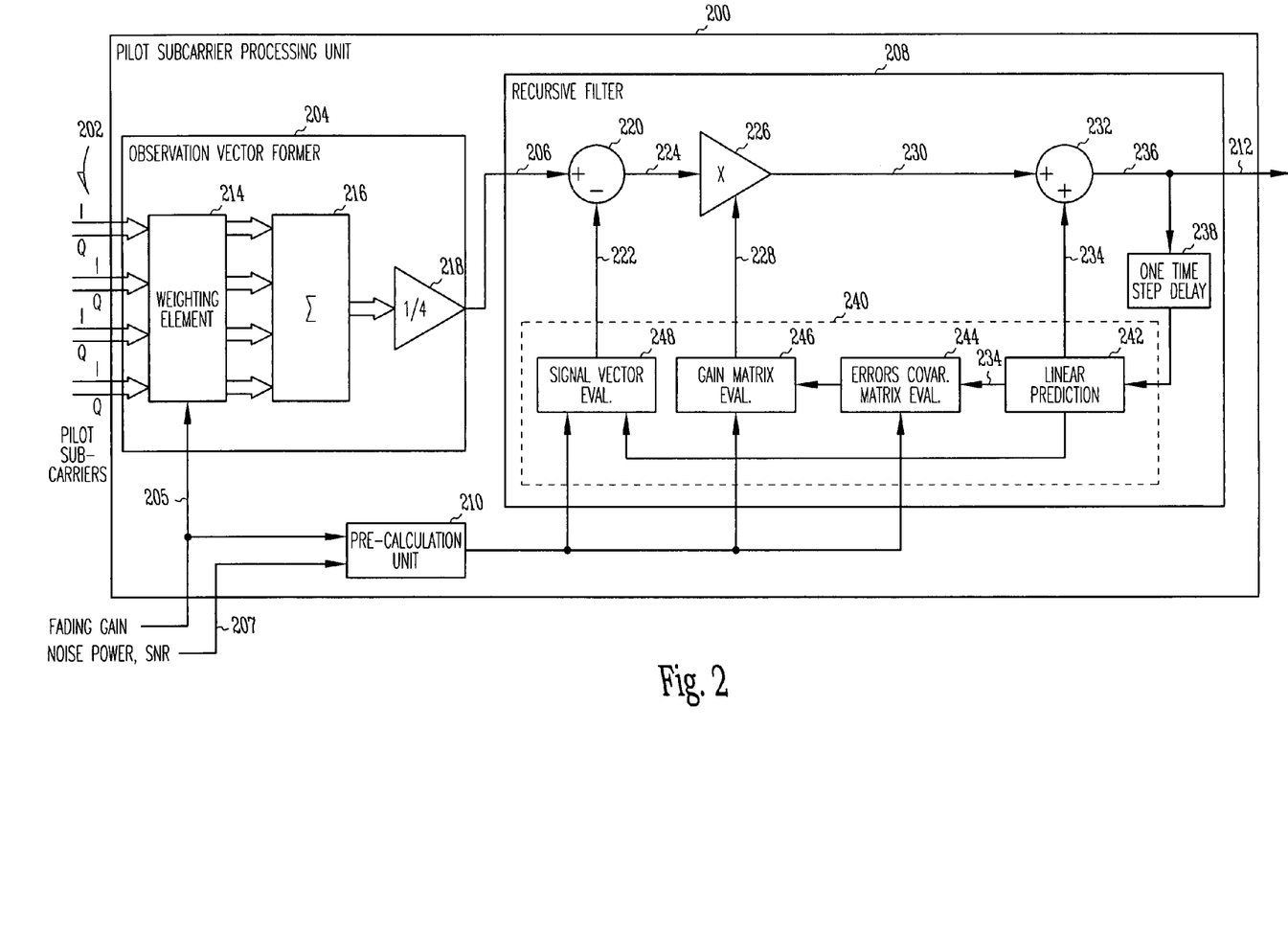
FIG. 2 is a functional block diagram of a pilot subcarrier processing unit in accordance with an embodiment of the present invention.

FIG. 2 is a functional block diagram of a pilot subcarrier processing unit in accordance with an embodiment of the present invention. Pilot subcarrier processing unit 200 may generate a phase compensation estimate for use in phase compensating data symbols of an OFDM packet. Pilot subcarrier processing unit 200 may be suitable for use as pilot subcarrier processing unit 156 (FIG. 1) although other processing units may also be suitable. Pilot subcarrier processing unit 200 may use the pilot subcarriers of a data symbol, along with, for example, a channel estimate, an additive noise power estimate, a signal to noise ratio (SNR) estimate, and/or a phase noise power value for generating the phase compensation estimate. The phase compensation estimate may be generated for data symbols of the OFDM packet and may be applied after performing an FFT on the subcarriers. The phase compensation estimate may also be applied after channel equalization of the data subcarriers. The phase compensation estimate may be used for phase tracking data symbols during processing of the OFDM packet. In one embodiment, pilot subcarrier processing unit 200 may also generate a frequency offset estimate for use in phase rotating a serial symbol stream prior to performing the FFT. Although pilot subcarrier processing unit 200 is illustrated as having several separate functional elements, one or more of the functional elements may be combined and may be implemented by combinations of software configured elements, such as processors including digital signal processors (DSPs), and/or other hardware elements. In an embodiment, pilot subcarrier processing unit 200 may operate as a phase tracking unit for use in phase compensating data symbols in an OFDM receiver system.

Pilot subcarrier processing unit 200 includes observation vector former 204 which may weight and combine pilot subcarriers 202 to generate observation vector 206. Pilot subcarriers 202 may be comprised in-phase (I) and quadrature phase (Q) signal components. Recursive filter 208 operates on observation vector 206 to generate phase compensation estimate 212. Pre-calculation unit 210 may recalculate fading gains 205 (e.g., channel estimates), and noise information and estimates 207. Noise information and estimates 207 may include at least one of an additive noise power estimate, SNR estimates, and a noise power value for use by recursive filter 208 in generating phase compensation estimate 212.

Observation vector former 204 includes weighting element 214 which may weight pilot subcarriers 202 based on fading gains 205 for pilot subcarriers 202 prior to combining the weighted subcarriers in combining element 216 to generate observation vector 206. Reduction element 218 may reduce the magnitude of the observation vector depending on the number of pilot subcarriers combined in element 216. For example, when four subcarriers are combined, element 218 may apply a magnitude reduction of ¼ to observation vector 206. In one embodiment, observation vector former 204 may generate an observation vector for data symbols of an OFDM packet from the pilot subcarriers of the packet.

In one embodiment, fading gains 205 may be generated from a channel estimate determined from long training symbols of the OFDM packet. In this embodiment, weighting element 214 may apply weights individually to pilot subcarriers. The weights may be complex conjugates of the fading gains of the pilot subcarriers. In one embodiment, the weights may also be calculated for pilot subcarriers to help maximize a signal to noise ratio (SNR) of observation vector 206. Pilot subcarriers 202 may be unequalized and may be separated from other subcarriers of a data symbol during performance of an FFT by an FFT element, such as FFT element 146 (FIG. 1). In one embodiment, channel equalizer 154 may equalize pilot subcarriers 202.

In one embodiment, recursive filter 208 may perform an extended Kalman filtering (EKF) process on the observation vector using a channel estimate, an additive noise power estimate, a signal to noise ratio (SNR) estimate, transceiver oscillator phase noise power value, and/or other a priori information from a dynamic model of the phase. The channel estimate may be generated from long training symbols of the OFDM packet, and the additive noise power estimate and the SNR estimate may be generated from short training symbols of the OFDM packet. The phase noise power value may be evaluated from a priori information about the phase noise spectrum of transceiver oscillators. In one embodiment, the channel estimate, the additive noise power estimate, the SNR estimate, and the phase noise power value may be used by recursive filter 208 for all data symbols of the OFDM packet.

Recursive filter 208 may include subtraction element 220 to subtract predicted observation vector 222 from observation vector 206 to generate residual vector 224. Recursive filter 208 may also include multiplication element 226 to multiply residual observation vector 224 by gain matrix result 228 to generate residual gain vector 230. Addition element 232 may add residual gain vector 230 to linear prediction vector 234 to generate estimate vector 236. Estimate vector 236 may be a multi-dimensional vector comprised of a frequency offset estimate and phase compensation estimate 212. The dimension of estimate vector 236 may depend on the dimension of a state equation used to dynamically model the phase. The frequency-offset estimate may be applied to phase rotator 141 (FIG. 1) to rotate a phase of a serial symbol stream comprising the data symbols prior to performing the FFT on the data symbols. Phase compensation estimate 212 may be applied to a data symbol subsequent to the FFT. The frequency offset estimate and phase compensation estimate 212 may be extracted from the estimate vector 236. The frequency-offset estimate may be provided to a phase rotator, such as phase rotator 141 (FIG. 1) as frequency offset estimate 139.

Current observation vector 206 may be represented as vector $z(k+1)$, predicted observation vector 222 may be represented as vector $h[x(k+1|k)]$, residual vector 224 may be represented as vector $\tilde{z}(k+1)$, gain matrix result 228 may be represented as matrix $K(k+1)$, residual gain vector 230 may be represented as vector $K(k+1)\tilde{z}(k+1)$, linear prediction vector 234 may be represented as vector $\hat{x}(k+1|k)$, and estimate vector 236 may be represented as vector $\hat{x}(k+1)$. "k" may represent a particular data symbol of the plurality of data symbols of an OFDM packet, wherein an iteration of the filter, k may be incremented by one. Phase compensation estimate 212 may be represented as $\hat{\theta}(k+1)$, extracted from estimate vector 236 $\hat{x}(k+1)$.

In an alternate embodiment, observation vector 206 may include the four complex values comprising the quadrature components of the pilot subcarriers quadrature components. This alternate embodiment, however, may lead to larger dimension (e.g., an 8×8) matrix computation by calculation block 240.

Recursive filter 208 may also include one time step delay element 238 which may store previous step estimate vector 236 $\hat{x}(k)$ for use by calculation block 240 in generating linear prediction vector 234 and gain matrix 228. In another embodiment, one-time step-delay element 238 may be placed after linear prediction element 242 and may store linear prediction vector 234 $\hat{x}(k+2|k+1)$, provided by linear prediction element 242. Extracted from linear prediction vector 234, a frequency-offset estimate may be used by phase rotator 141 for rotating next (k+2) data symbol prior to performing the FFT.

Calculation block 240 receives recalculated fading gains, an additive noise power estimate, an SNR estimate and a phase noise power value from pre-calculation unit 210. Calculation block 240 may be designed in accordance with a dynamic model of the phase and may include linear prediction element 242, error covariance matrix evaluation element 244, gain matrix evaluation element 246 and signal vector evaluation element 248.

In one embodiment, recursive filter 208 may generate an estimated phase for the present symbol (e.g., the k+1 symbol) based on pilot subcarriers of a present symbol (e.g., the k+1 symbol) and previous value of multi-dimensional estimate vector 236. In this embodiment, referred to as a feed-forward scheme, a phase compensation estimate may be used by phase compensator 159 after performing an FFT. In another embodiment, recursive filter 208 may generate a predicted frequency offset and phase for a next data symbol (e.g., the k+2 symbol) based on pilot subcarriers of a present symbol (e.g., the k+1 symbol). In this embodiment, referred to as a feedback scheme, a frequency-offset estimate may be used in phase rotator 141 for the next data symbol (e.g., the k+2 symbol) prior to performing the FFT.

In one embodiment, pre-calculation block 210 recalculates fading gains, additive noise power estimates, SNR estimates (e.g., received from the short and/or long training symbol processing blocks), and a phase noise power value (e.g., from a priori information about the phase noise spectrum of transceiver oscillators) to help optimize parameters for recursive filter 208. Recursive filter 208 may be an Extended Kalman Filter (EKF) or other suitable recursive filter.

For a received packet, pre-calculation block 210 may calculate a variance of the additive noise in the observation model. The variance of the additive noise may be calculated from the additive noise power estimate done by the short training symbol processing block, and the fading gains done bye the long training symbol processing block. The values of the variances of the additive noise may be equal to the additive noise powers corresponding to pilot subcarriers. Accordingly, pilot subcarriers may have a different value for the variance of additive noise. From the values of the variance of the additive noise, a covariance matrix of the observation model noise may be generated and provided to errors covariance matrix evaluation element 244. In one embodiment, this covariance matrix of the observation model noise may be a diagonal matrix with equal elements. In other embodiments, elements of this matrix may be different. The dimension of the covariance matrix of the observation model noise may depend on the dimension of observation vector 206. Elements of the covariance matrix of the observation model noise may be used for performing a recurrent algorithm by errors covariance matrix evaluation element 244. Elements of the covariance matrix of the observation model noise may also be used for performing a recurrent algorithm by gain matrix evaluation element 246 for an iteration of filter 208.

For a received packet, pre-calculation block 210 may also calculate a variance of the additive noise in the dynamic model of the phase for use by recursive filter 208. This variance may be calculated from a priori information about phase noise spectrum of transceivers oscillators. The value of this variance may be used by errors covariance matrix evaluation element 244 for an iteration of filter 208. From this value, a covariance matrix of the noise in the state equation representing the dynamic model of the phase may be formed. The dimension of this matrix may depend on the dimension of a state equation (e.g., a phase system model). In one embodiment, this covariance matrix of the noise in the state equation may be 2×2 matrix with at least one nonzero element. In other embodiments, the dimension and values of elements of this matrix may differ.

For a received packet, pre-calculation block 210 may also calculate an initial (e.g., a priori) variance of the frequency offset after the phase rotator. The initial variance may be calculated from SNR estimate 207 generated by the short training symbol processing block. In other embodiments, the initial variance of frequency offset may be calculated by the long training symbol processing block.

For a received packet, pre-calculation block 210 may also calculate an a priori variance of the initial phase error. This variance may be calculated from SNR estimate 207 and from information about phase noise spectrum of transceiver oscillators. These two variances may be used for initially forming a covariance matrix, which may be used as an initial condition by errors covariance matrix evaluation element 244 at the first iteration of recursive filter 208.

For a received packet, pre-calculation block 210 may also calculate parameters of a vector signal function h[x(k)] in the vector observation model for recursive filter 208. The parameters may be calculated from fading gains 205 of pilot subcarriers. Parameters of the vector signal function h[x(k)] may be used for performing a recurrent algorithm by errors covariance matrix evaluation element 244, for performing a recurrent algorithm by gain matrix evaluation element 246, and for performing a recurrent algorithm by signal vector evaluation element 248, for an iteration of recursive filter 208.

Linear prediction element 242 may perform a one-step prediction $\hat{x}(k+1|k)$ for the state vector x(k) (e.g., vector 236) on the basis of a known state equation (e.g., the dynamic model of the phase) and previous step estimate vector 236 $\hat{x}(k)$ from one-time step-delay element 238. In another embodiment (e.g., a feedback scheme), which may place one time step delay element 238 after linear prediction element 242, linear prediction vector element 242 may perform a one-step prediction $\hat{x}(k+2|k+1)$ based on present estimate vector 236 $\hat{x}(k+1)$.

Figure 3:
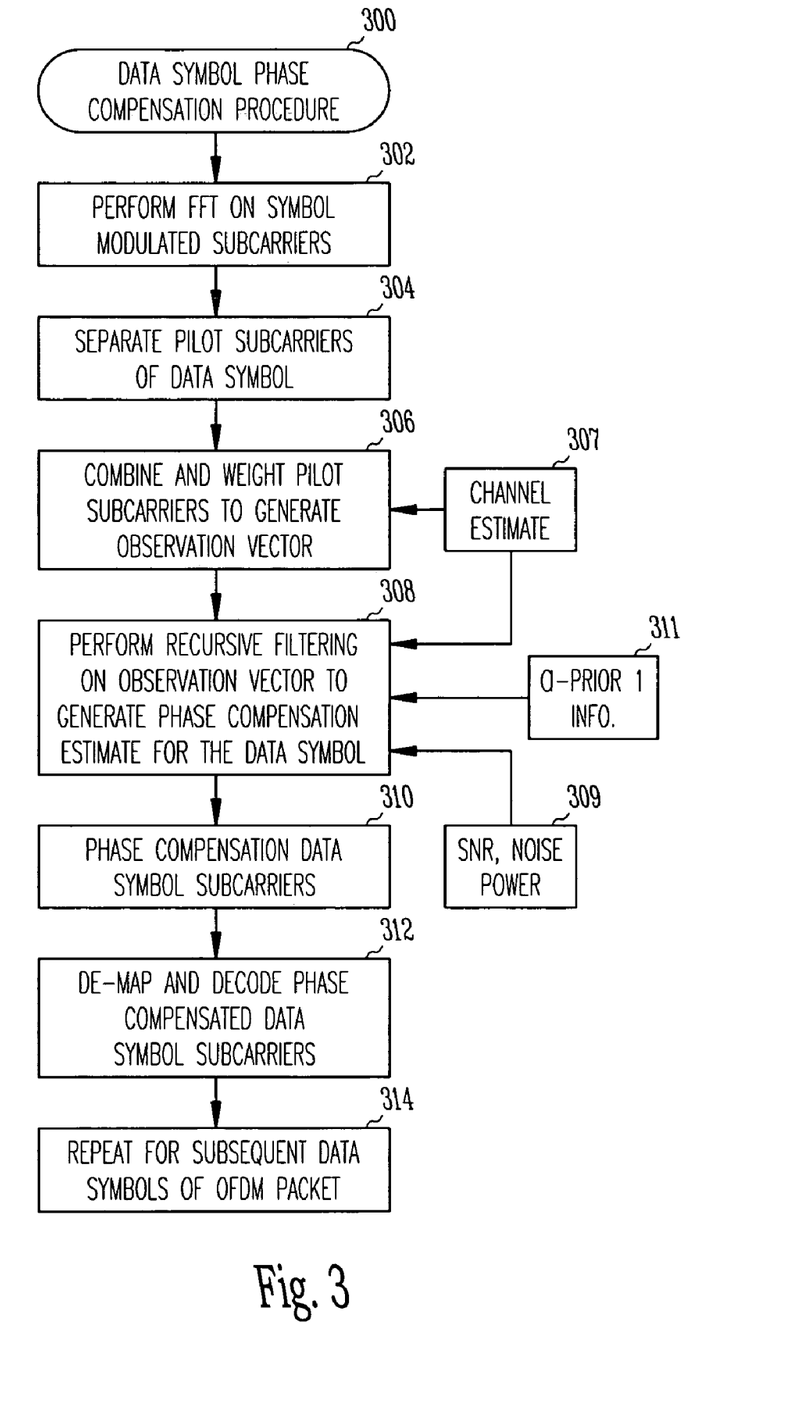
FIG. 3 is a flow chart of a data symbol phase compensation procedure in accordance with an embodiment of the present invention.

FIG. 3 is a flow chart of a data symbol phase compensation procedure in accordance with an embodiment of the present invention. Data symbol phase compensation procedure 300 may be used to generate phase compensation estimates for individual data symbols of an OFDM packet. Procedure 300 may be performed by OFDM receiver system 100 (FIG. 1) although other systems may also be suitable for performing procedure 300. Portions of procedure 300 may also be performed by pilot subcarrier processing unit 156 (FIG. 1) although other pilot subcarrier processing units may also be suitable. Although the individual operations of procedure 300 are illustrated and described as separate operations, one or more of the individual operations may be performed concurrently and nothing requires that the operations be performed in the order illustrated.

Operation 302 performs an FFT on a serial symbol stream (e.g., time-domain symbol modulated subcarriers) to generate frequency domain symbol modulated subcarriers. Some of the frequency-domain symbol modulated subcarriers may be pilot subcarriers of a data symbol of an OFDM data packet. In one embodiment, operation 302 may perform a FFT on parallel groups of time domain samples 144 (FIG. 1) to generate frequency domain symbol modulated subcarriers 147, 148 (FIG. 1). Operation 304 may separate pilot subcarriers 147 (FIG. 1) from other subcarriers 148 (FIG. 1) of a data symbol.

Operation 306 weights and combines the pilot subcarriers to generate an observation vector. In one embodiment, operation 306 may weight pilot subcarriers based on fading gains from channel estimate 307 for the pilot subcarriers prior to combining the weighted subcarriers to generate the observation vector. Operation 306 may be performed, for example, by observation vector former 204 (FIG. 2).

Operation 308 may perform recursive filtering on the observation vector to generate a phase compensation estimate for a data symbol. Operation 308 may use channel estimate 307 along with SNR and additive noise power estimates 309, and a priori information 311. A priori information may include information about the phase noise spectrum of transceiver oscillators and/or a dynamic model of the phase. In one embodiment, channel estimate 307 may be generated from one or more long training symbols of the OFDM packet. SNR and additive noise power estimates 309 may be generated from one or more of the short training symbols of the OFDM packet. The phase noise power value may be evaluated from a prior information about the phase noise spectrum of transceiver oscillators. In one embodiment, channel estimate 307, SNR and additive noise power estimate 309, and the phase noise power value may be used in determining the phase compensation estimates for substantially most or all data symbols of the OFDM packet. Operation 308 may be performed, for example, by recursive filter 208 (FIG. 2).

Operation 310 compensates phases of the subcarriers of a data symbol using the phase compensation estimate generated in operation 308. Operation 310 may be performed by phase compensator 159 (FIG. 1). Operation 312 may de-map and/or decode the phase compensated subcarriers of the data symbol to generate a portion of a decoded bit stream. Operation 314 repeats at least operations 306 through 312 for subsequent data symbols of an OFDM packet to generate other portions of a decoded bit stream. During the repetition of operations 306 through 312, operation 302 may continue performing an FFT on the serial symbol stream and operation 304 may continue separating out the pilot subcarriers of data symbol of an OFDM packet.

Thus, improved systems and methods for phase compensating data symbols of an OFDM packet have been described. The systems and methods of the present invention may provide for faster phase tracking convergence, as well as higher phase estimate precision over conventional PLL systems. Further, reduced complexity and cost of the analog portions of the OFDM receiver may be achieved because of the higher phase tracking performance, which may allow for the reduction in stability and phase noise requirements of the receiver and/or transmitter oscillators.

The foregoing description of specific embodiments reveals the general nature of the invention sufficiently that others can, by applying current knowledge, readily modify and/or adapt it for various applications without departing from the generic concept. Therefore such adaptations and modifications are within the meaning and range of equivalents of the disclosed embodiments. The phraseology or terminology employed herein is for the purpose of description and not of limitation. Accordingly, the invention embraces all such alternatives, modifications, equivalents and variations as fall within the spirit and scope of the appended claims.

What is claimed is:

1. A method for generating a phase compensation estimate comprising: recursively filtering an observation vector formed by weighted pilot subcarriers of a data symbol of an orthogonal frequency division multiplexed (OFDM) packet; and applying the phase compensation estimate to channel equalized subcarriers of the data symbol in the frequency domain after performance of a Fourier transform on the data symbol, wherein the pilot subcarriers are weighted based on fading gains, wherein the recursively filtering includes generating a predicted observation vector from a phase compensation estimate, the phase compensation estimate generated for a prior data symbol using a recursive algorithm, and wherein the recursively filtering includes subtracting the predicted observation vector from the observation vector, wherein recursively filtering comprises performing extended Kalman filtering on the observation vector using a channel estimate, an additive noise power estimate, a signal to noise ratio (SNR) estimate, a priori information about a dynamic model of phase, and a phase noise power value from a phase noise spectrum of transceiver oscillators.

2. The method of claim 1 wherein the phase compensation estimate is applied after channel equalization to the channel equalized subcarriers of the data symbol in the frequency domain prior to demapping the subcarriers,
   wherein channel estimate used to channel equalize the subcarriers are determined from long training symbols of the OFDM packet.

3. The method of claim 1 further comprising repeating generating and applying for subsequent data symbols of the OFDM packet,
 wherein the data symbol is comprised of a plurality of symbol modulated subcarriers, at least some of the symbol-modulated subcarriers of the plurality being the pilot subcarriers, and
 wherein generating the phase compensation estimate comprises:
  weighting the pilot subcarriers based on fading gains for the pilot subcarriers;
  combining the weighted pilot subcarriers in an observation vector former to generate the observation vector; and
  recursively filtering the observation vector using a channel estimate to generate the phase compensation estimate.

4. The method of claim 3 wherein repeating generating the phase compensation estimate comprises:
 combining the pilot subcarriers of a present data symbol to generate an observation vector for the present data symbol; and
 performing recursive filtering on the observation vector for the present data symbol using the channel estimate to generate the phase compensation estimate for the present data symbol.

5. The method of claim 3 wherein repeating generating the phase compensation estimates comprises:
 combining the pilot subcarriers of a present data symbol to generate an observation vector for the present data symbol; and
 performing recursive filtering on the observation vector for the present data symbol to generate a frequency offset estimate and the phase compensation estimates for a next data symbol.

6. The method of claim 5 wherein the channel estimate is generated from a long training symbol of the OFDM packet, and wherein the additive noise power estimate and the SNR estimate are generated from short training symbols of the OFDM packet.

7. The method of claim 6 wherein the OFDM packet is comprised of a plurality of sequential symbol modulated subcarriers, beginning with the short training symbols modulated on a portion of the subcarriers followed by the long training symbol and a plurality of data symbols, the data symbols containing at least one known pilot subcarrier,
 and wherein the channel estimate, the additive noise power estimate, the SNR estimate, and the phase noise power value are used substantially for data symbols of the OFDM packet.

8. The method of claim 3 wherein the method further comprises generating a channel estimate from long training symbols of the OFDM packet, and
 wherein weighting includes applying weights to pilot subcarriers, the weights being complex conjugates of the fading gains of the pilot subcarriers, the fading gains being determined from the channel estimate.

9. The method of claim 1 wherein the recursively filtering comprises:
 subtracting the predicted observation vector from the observation vector to generate a residual vector;
 multiplying the residual vector by a gain matrix to generate a residual gain vector;
 adding the residual gain vector to a linear prediction vector to generate an estimate vector; and
 extracting a frequency offset estimate and the phase compensation estimate for the data symbol from the estimate vector.

10. The method of claim 9 wherein the estimate vector is a multi-dimensional vector comprised of the frequency offset estimate and the phase compensation estimate, and wherein the phase compensation estimate is applied to a data symbol subsequent to performing a Fast Fourier Transform (FFT) on the data symbol.

11. The method of claim 9 wherein the estimate vector is a multi-dimensional vector comprised of a frequency offset estimate and the phase compensation estimate, and
 wherein the method further comprises rotating a phase of a serial symbol stream comprising the data symbol prior to performing a Fast Fourier Transform on the data symbol based at least on the frequency offset estimate.

12. The method of claim 2 further comprising:
 rotating a phase of a serial symbol stream comprising the data symbol prior to performing a Fast Fourier Transform on the data symbol, the rotating based at least on the frequency offset estimate;
 performing a Fast Fourier Transform (FFT) on the plurality of parallel groups of time-domain samples that represent the data symbol to generate frequency domain symbol modulated subcarriers prior to applying the phase compensation estimate;
 separating the pilot subcarriers from data subcarriers of the frequency domain symbol modulated subcarriers for use in generating the phase compensation estimate; and
 demapping the data symbol after channel equalization and after applying the phase compensation estimate to generate at least a portion of a decoded bit stream.

13. The method of claim 2 wherein the pilot subcarriers are comprised of modulated pilot symbols having known training values and modulated on a predetermined portion of subcarriers of the plurality.

14. A phase tracking unit comprising:
 an observation vector former to weight and combine pilot subcarriers of a data symbol of an orthogonal frequency division multiplexed (OFDM) packet to generate an observation vector; and
 a recursive filter to recursively filter the observation vector to generate a phase compensation estimate for the data symbol, the recursive filter using a channel estimate, an additive noise power estimate, a signal to noise ratio (SNR), and a phase noise value estimate to perform the recursive filtering,
 wherein the phase compensation estimate is applied to channel equalized subcarriers of the data symbol in the frequency domain after channel equalization and performance of a Fourier transform, and
 wherein the observation vector former weights the pilot subcarriers based on fading gains,
 wherein the recursive filter includes generates a predicted observation vector from a phase compensation estimate generated for a prior data symbol using a recursive algorithm, and subtracts the predicted observation vector from the observation vector.

15. The phase tracking unit of claim 14 wherein the observation vector former includes a weighting element to weight the pilot subcarriers based on the fading gains for the pilot subcarriers.

16. The phase tracking unit of claim 15 wherein the weighting element receives the channel estimate generated from long training symbols of the OFDM packet, and wherein the weighting element applies weights to pilot subcarriers, the weights being complex conjugates of the fading gains, the fading gains being determined from the channel estimate.

17. The phase tracking unit of claim 14 wherein the recursive filter performs recursive filtering to generate phase compensation estimates for a present data symbol of the OFDM packet.

18. The phase tracking unit of claim 17 wherein the observation vector former further combines the pilot subcarriers of the present data symbol to generate an observation vector for the present data symbol; and
the recursive filter recursively filters the observation vector for the present data symbol to generate the phase compensation estimate for the present data symbol.

19. The phase tracking unit of claim 18 wherein the recursive filter subtracts the predicted observation vector from the observation vector to generate a residual vector, multiplies the residual vector by a gain matrix to generate a residual gain vector, adds the residual gain vector to a linear prediction vector to generate an estimate vector and extracts the phase compensation estimate for the data symbol from the estimate vector.

20. The phase tracking unit of claim 19 wherein the estimate vector is a multi-dimensional vector comprised of frequency offset and the phase compensation estimates, and
wherein extracting includes extracting the phase compensation estimate for a data symbol from the estimate vector, and
wherein the phase compensator applies the phase compensation estimate to the data symbol subsequent to performing a Fast Fourier Transform on the data symbol.

21. An orthogonal frequency division multiplexed (OFDM) receiver system comprising: a dipole antenna to receive signals that include an OFDM packet; an RF receive unit to convert the OFDM packet to a stream of symbols; a data symbol-processing unit to perform a Fast Fourier Transform (FFT) on the stream of symbols to generate a decoded bit stream; a channel equalizer to perform channel equalization on subcarriers provided by the FFT; a phase tracking unit to generate phase compensation estimates based on channel conditions; and a phase compensator to apply the phase compensation estimate to channel equalized subcarriers of a data symbol of the OFDM packet in the frequency domain after performing the FFT, wherein the phase tracking unit generates the phase compensation estimate by recursively filtering an observation vector formed by weighted pilot subcarriers, wherein the pilot subcarriers are weighted based on fading gains, and wherein the recursively filtering includes generating a predicted observation vector from a phase compensation estimate generated for a prior data symbol using a recursive algorithm, and subtracting the predicted observation vector from the observation vector, wherein the recursive filter is an extended Kalman filter and uses a channel estimate, an additive noise power estimate, a signal to noise ratio (SNR) estimate, a priori information about a dynamic mode of phase, and a phase noise power value from a phase noise spectrum of transceiver oscillators to generate the phase compensation estimate.

22. The system of claim 21 wherein the phase compensator includes:
an observation vector former to combine and weight the pilot subcarriers to generate the observation vector; and
a recursive filter to recursively filter the observation vector to generate a frequency offset and the phase compensation estimates for phase compensating the data symbol.

23. The system of claim 22 wherein the observation vector former includes a weighting element to weight the pilot subcarriers based on the fading gains for the pilot subcarriers prior to combining the weighted subcarriers in generating the observation vector.

24. The system of claim 23 further comprising a long training symbol processing element to generate a channel estimate from a long training symbol of the OFDM packet, and wherein the weighting element applies weights to the pilot subcarriers, the weights being complex conjugates of the fading gains of the pilot subcarriers, the fading gains being determined from the channel estimate.

25. The system of claim 21 further comprising: a long training symbol processing element to generate the channel estimate from a long training symbol of the OFOM packet; and a short training symbol processing element to generate the additive noise power estimate and the SNR estimate from short training symbols of the OFDM packet, and wherein the channel estimate, the additive noise power estimate, the SNR estimate and the phase noise power value are used for subsequent data symbols of the OFDM packet.

26. A computer-readable medium that stores instructions for execution by one or more processors to perform operations that result in: generating a phase compensation estimate by recursively filtering an observation vector formed by weighted pilot subcarriers of a data symbol of an orthogonal frequency division multiplexed (OFDM) packet; and applying the phase compensation estimate to channel equalized subcarriers of the data symbol in the frequency domain after performance of a Fourier transform on the data symbol, wherein the pilot subcarriers are weighted based on fading gains, and wherein the recursively filtering includes generating a predicted observation vector from a phase compensation estimate generated for a prior data symbol using a recursive algorithm, and subtracting the predicted observation vector from the observation vector, wherein recursively filtering comprises performing extended Kalman filtering on the observation vector using a channel estimate, an additive noise power estimate, a signal to noise ratio (SNR) estimate, a priori information about a dynamic model of phase, and a phase noise power value from a phase noise spectrum of transceiver oscillators.

27. The computer-readable medium of claim 26 wherein the instructions, when executed by the one or more processors, further result in repeating generating and applying for subsequent data symbols of the OFDM packet, and wherein the data symbol is comprised of a plurality of symbol modulated subcarriers.

28. The computer-readable medium of claim 27 wherein generating the phase compensation estimate results in:
weighting the pilot subcarriers based on the fading gains for the pilot subcarriers; combining the weighted pilot subcarriers in an observation vector former to generate the observation vector; and
recursively filtering the observation vector to generate the phase compensation estimate,
and wherein repeating generating the phase compensation estimate results in:
combining the pilot subcarriers of a present data symbol to generate an observation vector for the present data symbol; and
performing recursive filtering on the observation vector for the present data symbol using the channel estimate to generate the phase compensation estimate for the present data symbol.

* * * * *

UNITED STATES PATENT AND TRADEMARK OFFICE
CERTIFICATE OF CORRECTION

PATENT NO. : 7,457,366 B2 Page 1 of 1
APPLICATION NO. : 10/675215
DATED : November 25, 2008
INVENTOR(S) : Maltsev et al.

It is certified that error appears in the above-identified patent and that said Letters Patent is hereby corrected as shown below:

In column 14, line 13, in Claim 25, delete "OFOM" and insert -- OFDM --, therefor.

Signed and Sealed this

Twenty-seventh Day of January, 2009

JOHN DOLL
*Acting Director of the United States Patent and Trademark Office*